United States Patent [19]
Tasi et al.

[11] Patent Number: 6,003,833
[45] Date of Patent: Dec. 21, 1999

[54] INTEGRATED MICRO PRESSURE-RESISTANT FLOW CONTROL MODULE

[75] Inventors: Ming-Jye Tasi, Chang Hua; Min-Chieh Chou, Taipei, both of Taiwan

[73] Assignee: Industrial Technology Research Institute, Hsinchu, Taiwan

[21] Appl. No.: 09/006,157

[22] Filed: Jan. 13, 1998

[30] Foreign Application Priority Data

Oct. 16, 1997 [TW] Taiwan .................................. 86115178

[51] Int. Cl.⁶ .................................................. F16K 31/02
[52] U.S. Cl. ...................... 251/11; 251/129.06; 251/118; 251/368
[58] Field of Search ................................ 251/11, 129.01, 251/129.06, 118, 368

[56] References Cited

U.S. PATENT DOCUMENTS

| | | | |
|---|---|---|---|
| 5,058,856 | 10/1991 | Gordon et al. | 251/11 |
| 5,161,774 | 11/1992 | Engelsdorf et al. | 251/129.06 X |
| 5,529,279 | 6/1996 | Beatty et al. | 251/11 |
| 5,785,295 | 7/1998 | Tsai | 251/11 |

*Primary Examiner*—Kevin Lee
*Attorney, Agent, or Firm*—Smith, Gambrell & Russell, LLP

[57] ABSTRACT

An integrated micro pressure-resistant flow control module in which, when a fluid enters the integrated module past a pressure-resistant fluid channel and a suspended microstructure into a thermally-driven microvalve zone, the latter utilizes heat actuation to drive a silicon microbridge with mesa to open a linear proportional flow microvalve. A pressure-resistant flow sensing unit is disposed before the fluid channel to sense the flow amount. The flow sensing unit has a micro-suspending arm of pressure-resistant material located vertically at the fluid entrance of the module. The momentum of the fluid is thereof vertical to the micro-uspending arm, and the flow value is obtained by the deflection of the micro-suspending arm which changes the resistance value. The sensing unit is synchronously made with the microvalve and the silicon microbridge structure in an integration process so as to reduce manufacturing steps and minimize the size of the module.

19 Claims, 9 Drawing Sheets

INTEGRATED MICRO PRESSURE-RESISTANT FLOW CONTROL MODULE

BACKGROUND OF THE INVENTION (a) Field of the Invention

The present invention relates generally to a microflow controller, and more particularly to an integrated pressure-resistant flow control module.

The present invention is applicable for use on all kinds of microflow control apparatus. For instance, the present invention is particularly adapted to couple with microvalves and to be synchronously manufactured therewith on the same substrate. The present invention is also particularly adapted for use in micro control of gases.

(b) Description of the Prior Art

A study of the microflow elements and systems made using existing micromachining techniques shows that they are characterized in their capability to precisely sense and control micro amount of fluid. In general, for gases, the amount of flow controlled is below 1 l/min. For liquids, it is about ul/min. Aside from being capable of precisely sensing and controlling micro amounts of fluid, the microflow elements and their systems have the advantages of power economy, quick response time, and compactness. Furthermore, due to the characteristics of micro manufacturing techniques, different sensors, actuators, and control circuits can be integrated on the same chip. Therefore, they can provide systematic, multi-functional, and even intelligent microflow system modules within very small units. The microflow elements can also be assembled in arrays to achieve precision control of larger flows. At present, the application of microflow mechanical devices has possibly replaced traditional precision flow control elements in part or made it possible to develop compact fluid sensors. In the future, when the development of micro manufacturing techniques and sensors has become more mature, the applications of microflow will be more comprehensive and become multi-functional and intelligent, which will then have a huge impact on industries.

In U.S. Ser. No. 08/667,906 filed on Aug. 27, 1996 by the applicant of the present invention, various prior art techniques concerning microvalves have been generally discussed. These prior art techniques include U.S. Pat. Nos. 5,142,781, 5,180,623, 5,058,856, 5,271,597, 5,259,737, and 5,429,713, as well as the papers entitled "Microflow Devices and Systems" (pages 157–171, Micromech. Microeng. published by IOP, U.K. in April 1994) and "Integrated Microflow Control Systems (pages 161–167, Sensors and Actuators, The Netherlands, 1990). T. Lisec et al. have also discussed thermal buckling control of microvalves on pages 13–17 of IEEE, 1994.

The present invention is the applicant's continued study on micromachining to further exploit the advantages thereof.

In today's precision analysis instruments and semiconductor manufacturing equipment, mass flow controllers (MFC) are often used to provide precision control of gas flow. The components of MFC include precision control valves, flow sensors and system controllers. Electromagnetic or piezo-electric valves are generally used as precision control valves, whereas capillary heating type flow sensors are used as sensors. Since all components are made by ultra-precision machining techniques and finished by employing mechanical sealing techniques, the parts of the entire system are many and complicated. Assembly is difficult and manufacturing cost is therefore high.

SUMMARY OF THE INVENTION

A primary object of the present invention is to provide an MEMS-based integrated microflow control system module utilizing micromachining techniques and microflow system techniques to replace conventional precision control valves and flow sensors.

Another object of the present invention is to provide a compact and very reliable integrated micro pressure-resistant flow control module which is inexpensive to manufacture and has a relatively large dynamic control range.

A further object of the present invention is to provide an integrated micro pressure-resistant flow control module in which the microvalve and flow sensor thereof are synchronously manufactured during the integration process.

In order to achieve the above-mentioned objects, the integrated microflow control module of the present invention is comprised of three layers of laminate structures connected together and has a proportional microvalve and a sensor unit to execute flow control. The sensor unit utilizes pressure resistance characteristics to sense flow values. Fluid enters from an inlet end at the uppermost or lowermost layer, passes firstly through a fluid channel and is then guided to a suspended micro structure. Finally, the fluid enters a thermally-driven microvalve zone. The microvalve zone mainly utilizes such thermal drive as thermal buckling or thermal bimetal, to drive a silicon microbridge with mesa. The microbridge has the functions of normal close and is capable of being driven open with the external voltage proportion. The present invention utilizes integrated micromachining to manufacture both the microvalve and the microflow sensor at the same time although they have different functions. The present invention reduces the processing steps and simplifies assembly. Besides, the microflow control module of the invention is highly reliable, inexpensive, and compact. In the future, the present invention can be used in precision gas flow control required in precision analysis instruments and semiconductor manufacturing equipment.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

In the module of the present invention, fluid enters from the inlet at the upper or lower layer, and passes a pressure-resistant flow sensing zone which mainly consists of micro-suspending arm structure made of a silicon film and precipitated or driven-in pressure resistant materials. The principle of flow sensing is that when there is no change in the fluid flow, the micro-structure will not deflect, and as the fluid flows, the vertical momentum change is transmitted to the micro-structure and causes a deflection of the microstructure thereby. With the pressure-resistant material comprised in the structure, the deflection will influence the change of the resistance; a flow value is therefore obtained through the process of external circuit signals. The fluid continues to flow to the microvalve zone, which is mainly comprised of a mesa microbridge structure (generally of a thickness about 10 um), with precipitated or driven-in thermally resistant material on the microbridge structure. When supplied with external electric currents, the microbridge structure will be heated and deflect in shape. Heating materials are generally polysilicon or bimetal or other metal materials such as platinum (Pt) or Tungsten (W). The thermally-driven microstructure cooperates with a projection at the outlet of the valve nozzle so that when the microbridge structure initially generates micro deflection and becomes arched, it may achieve larger linear deflection. Therefore, when not supplied with external electric currents, the microstructure will not deflect so that the fluid fills the interior of the module unit. At the same time, the flow sensing zone will not detect any change in flow. When supplied with external electric currents, the microstructure is heated and deflects, so that the fluid flows steadily towards the outlet at the lower layer. At the same time, the flow sensing zone will detect the change in flow.

Figure 1:
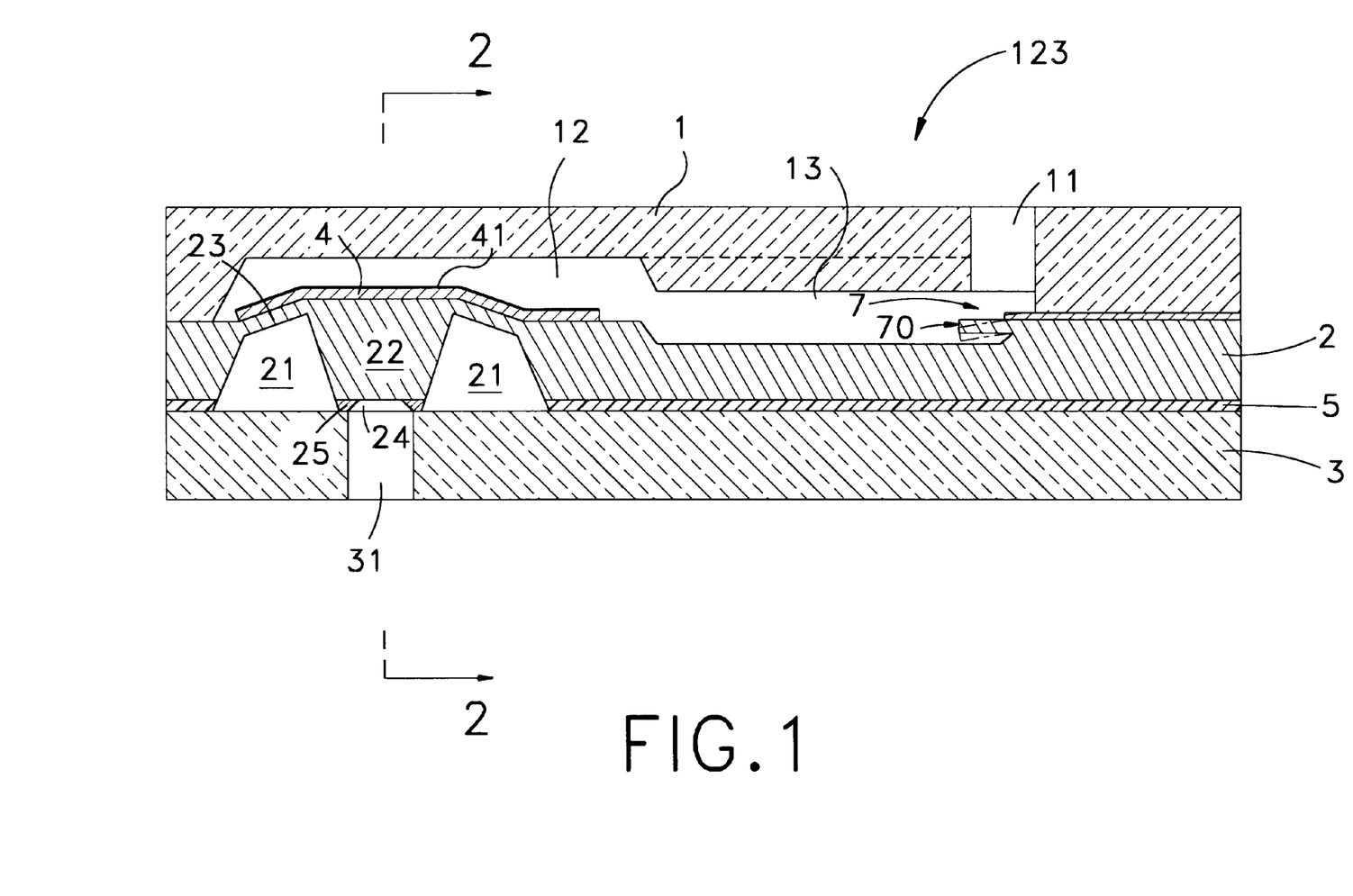
FIG. 1 is a sectional view of a first preferred embodiment of the integrated micro pressure-resistant fluid control module of the present invention.
Figure 2:
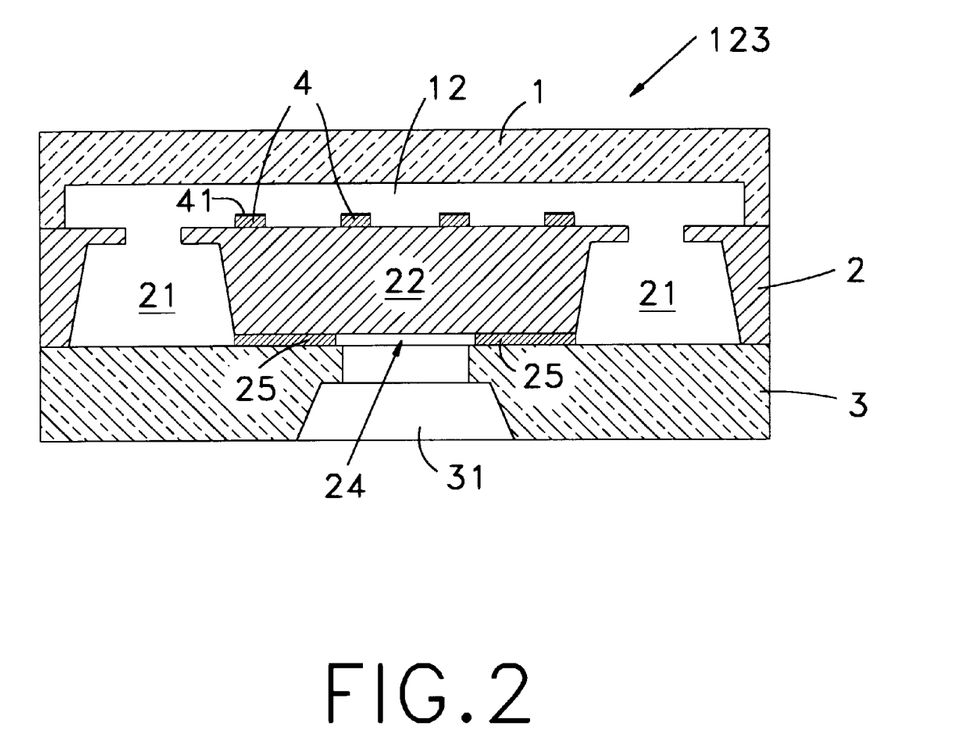
FIG. 2 is a sectional view taken along line 2—2 of FIG. 1.
Figure 2A:
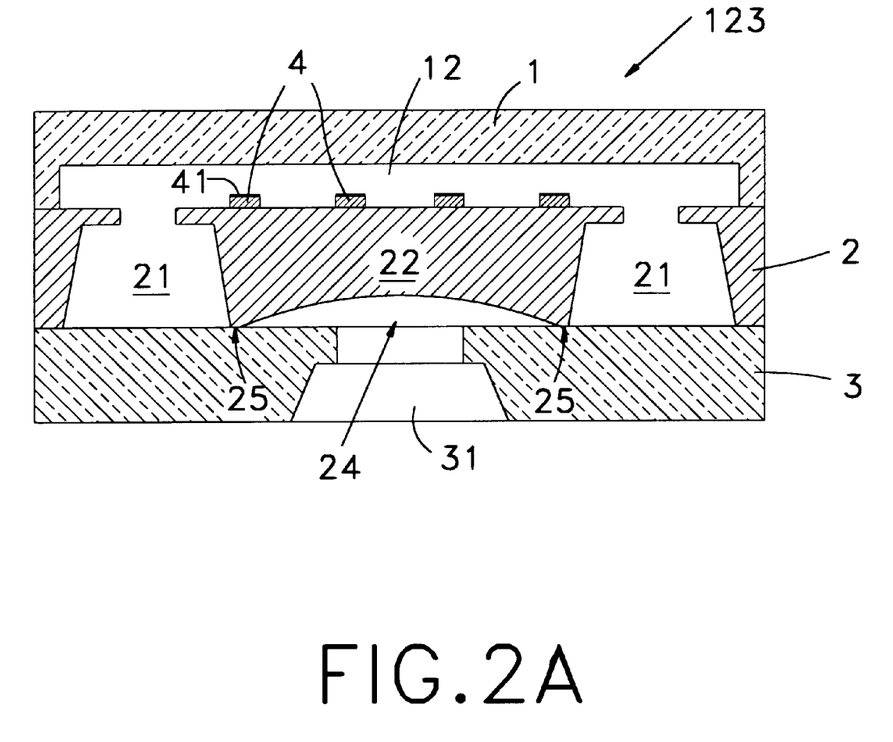
FIG. 2A is similar to FIG. 2, but showing another embodiment of the valve seat.
Figure 3:
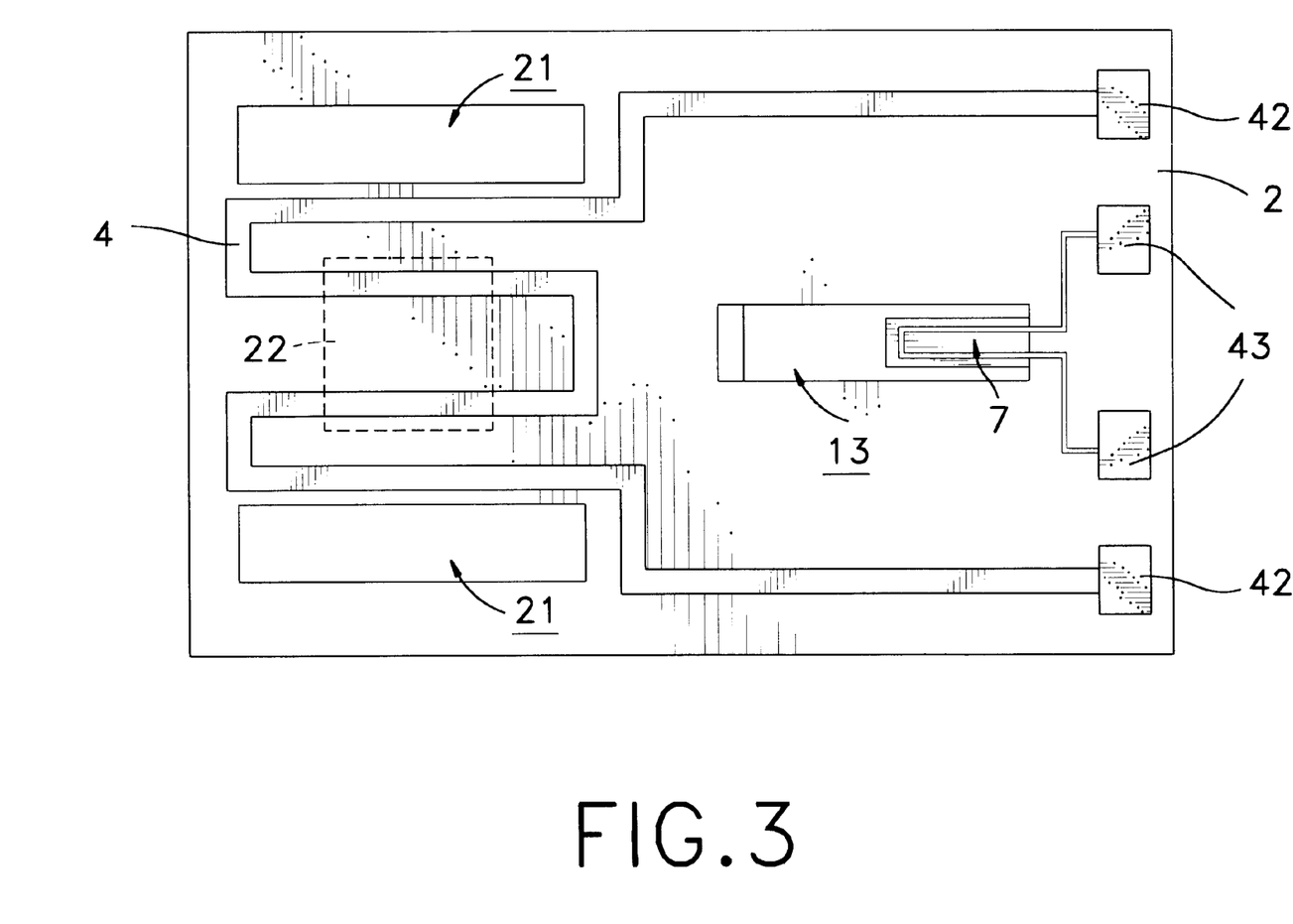
FIG. 3 is a top plan view of the intermediate layer of the invention.

A module 123 shown in FIGS. 1, 2, and 3 comprises an upper layer 1, an intermediate layer 2, and a lower layer 3. The upper layer 1 is preferably comprised of pyrex glass. The intermediate layer 2 has a mesa suspension 22 and a microbridge structure 23. Silicon material can be selected to form the intermediate layer 2, with polysilicon precipitated thereon. The intermediate layer 2 is connected to an electric power source so that when electric currents flow therethrough, thermal buckling can be generated to provide power. The intermediate layer 2 has a valve nozzle 24 having a lower rim as shown in FIG. 2, in which precipitated nickel, high polymer material or silicon, etc., can be used to form a valve seat 25 of excellent sealing effects. Alternatively, as shown in FIG. 2A, the intermediate layer 2 directly extends downwardly to form the valve seat 25. The bottom rim of the valve seat 25 can also be a curved surface or a planar surface as shown in FIG. 2. Glass material can be considered to form the lower layer 3.

Figure 1A:
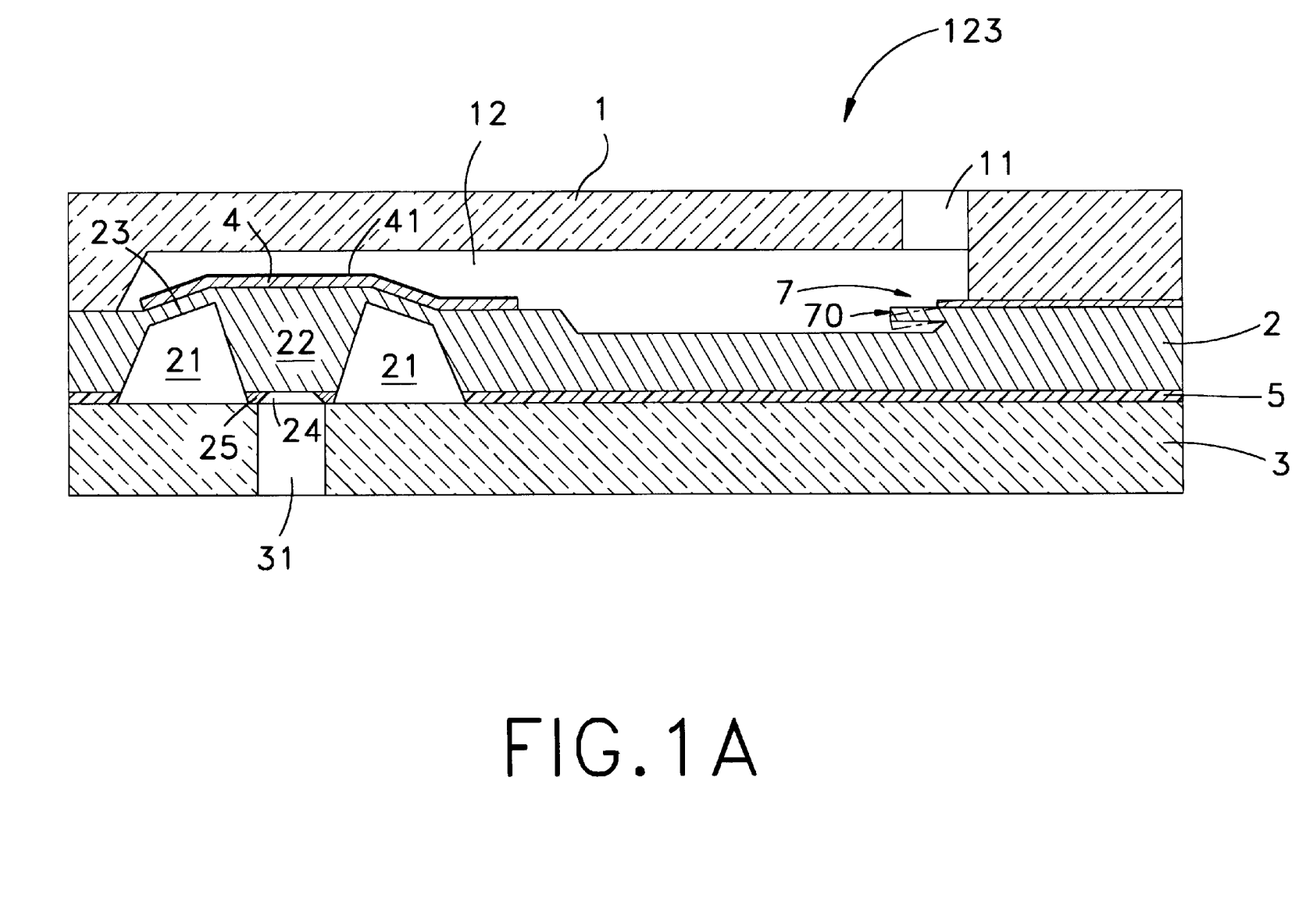
FIG. 1A is similar to FIG. 1, but showing another embodiment.
Figure 4:
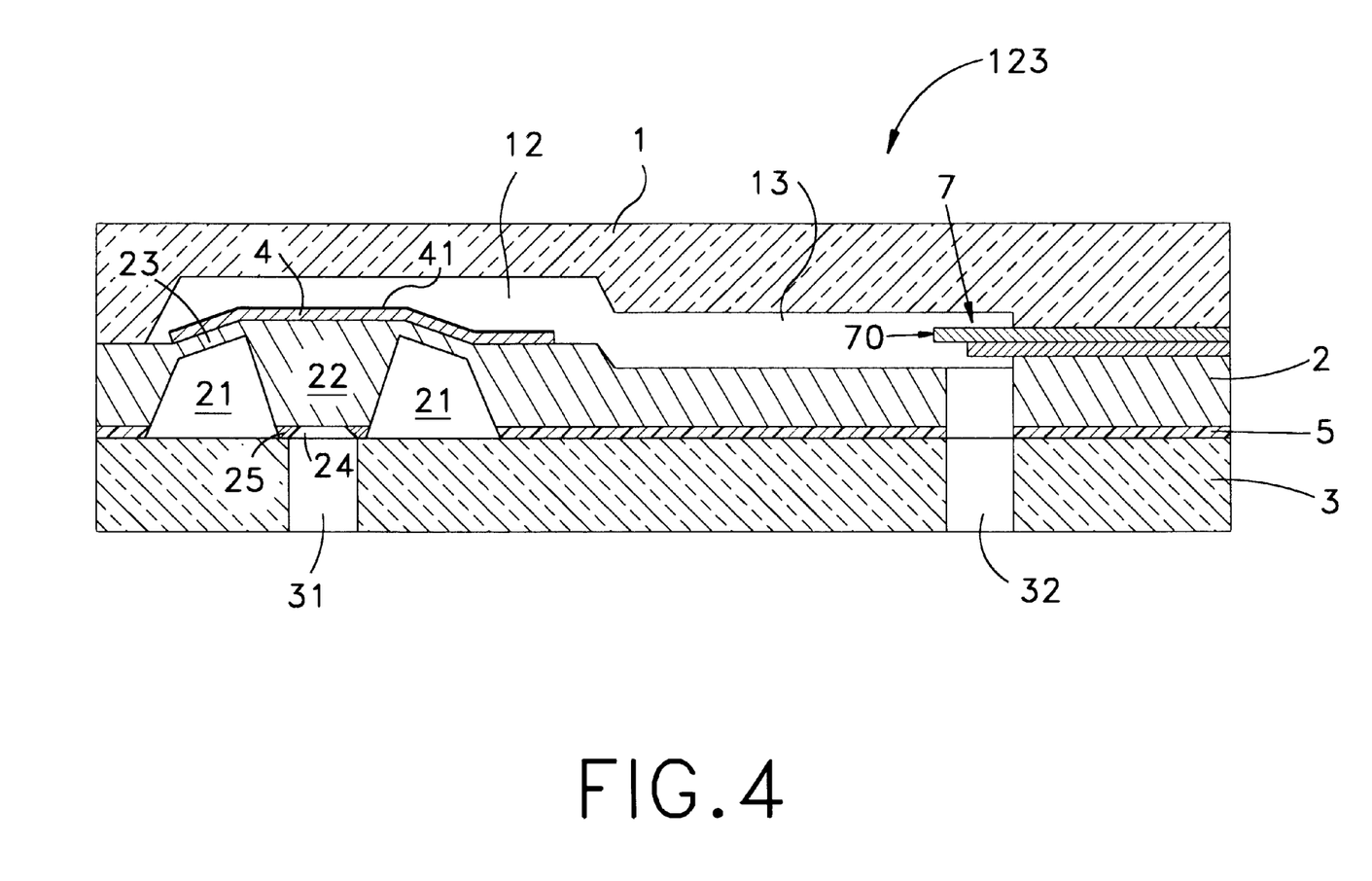
FIG. 4 is similar to FIG. 1, but showing a second preferred embodiment.

Fluid enters from an inlet 11 of the upper layer 1 or an inlet 32 of the lower layer 3 as shown in FIG. 4, past a flow sensing unit 7 and a fluid channel, such as a microflow channel 13 shown in FIG. 1 or 4, to a pressure chamber 12. Referring to FIG. 1A, the effects of the above-described embodiments can also be achieved by directly coupling the inlet 11 of the upper layer 1 to the pressure chamber 12 without the special arrangement of a microflow channel 13. When there is no supply of electric currents, the microvalve is closed. But when there is supply of electric currents, by means of thermal buckling, the suspension 22 and the microbridge structure 23 in the microvalve zone deflect, opening the valve nozzle 24 so that the fluid flows out via the outlet 31 of the lower layer 3, and the pressure-resistant flow sensing unit 7 emits a signal to the control unit which controls the amount of electric currents supplied to the intermediate layer 2 to adjust the extent of the opening of the valve nozzle 24.

A preferred embodiment of the present invention comprises an upper layer 1, having a first end and a second end, the first end having a pressure chamber 12 which communicates with the second end via a microflow channel 13; an intermediate layer 2, tightly coupled to a lower rim of the upper layer 1 and having a first end which has a lower portion provided with a semi-closed pressure distribution chamber 21 communicating with the pressure chamber 12 (see FIG. 2), the pressure distribution chamber 21 further having a valve nozzle 24 preferably disposed at a central region thereof; A part of the first end of the intermediate layer 2 forms a mesa suspension 22 by precipitation and etching, which is located at an upper region of the valve nozzle 24. The suspension 22 at least has two sides respectively provided with a microbridge structure 23 formed by recipitation or etching, the suspension 22 having a thermally-driven element, such as an electric heating film 4 coated with a protective film 41 and connected to a terminal 42 in FIG. 3, laid on an upper rim thereof. The terminals 42, 43 are both connected to a control circuit so that the deflection of the intermediate layer by thermal buckling can be generated when supplied with currents; and a lower layer 3 tightly coupled to a lower rim of the intermediate layer 2 with an insulating film 5 disposed therebetween, the lower layer 3 having a first end and a second end, one of which is provided with a fluid outlet 31 which communicates with the pressure distribution chamber 21 via the valve nozzle 24. The front end of the microflow channel 13 forms a microflow sensing unit 7 by precipitation or etching. The sensing unit 7 is formed when the upper rim of the intermediate layer 2 and the mesa suspension 22 and the microbridge structure 23 are formed by precipitation and etching. Besides, the sensing unit 7 which has a micro-suspending arm 70 reflect the change in resistance via pressure resistant material so as to sense the amount of flow.

Figure 3A:
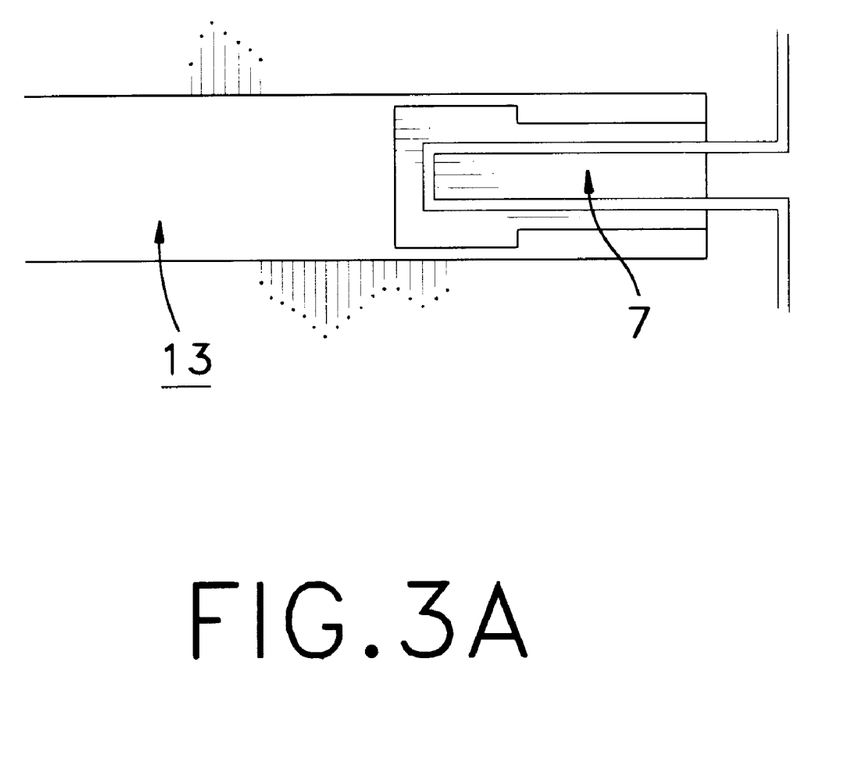
FIG. 3A is an enlarged view of FIG. 3 in part showing another Embodiment of the micro-suspending arm.

FIGS. 1 and 3 shows that the sensing unit 7 is a sensor defined as a micro-suspending arm 70 of pressure-resistant material and is made by integration process. The free length of the micro-suspending arm 70 is preferably 100~400 m and the width is preferably 30~200 m. When fluid flows, a free end of the sensor will deflect as shown by the dotted line in FIG. 1. The bigger the flow amount is, the greater the deflection will be, and accordingly, the detected resistance value will be different. In other words, the sensing unit 7 can output different resistance values to the control circuit (not shown). The flow values obtained can be used as a parameter of the electric current flow to be supplied to the film 4 in the microvalve zone. The end of the micro-suspending arm, as shown in FIG. 3A, can be formed with a larger surface for bearing greater fluid pressure.

Figure 6:
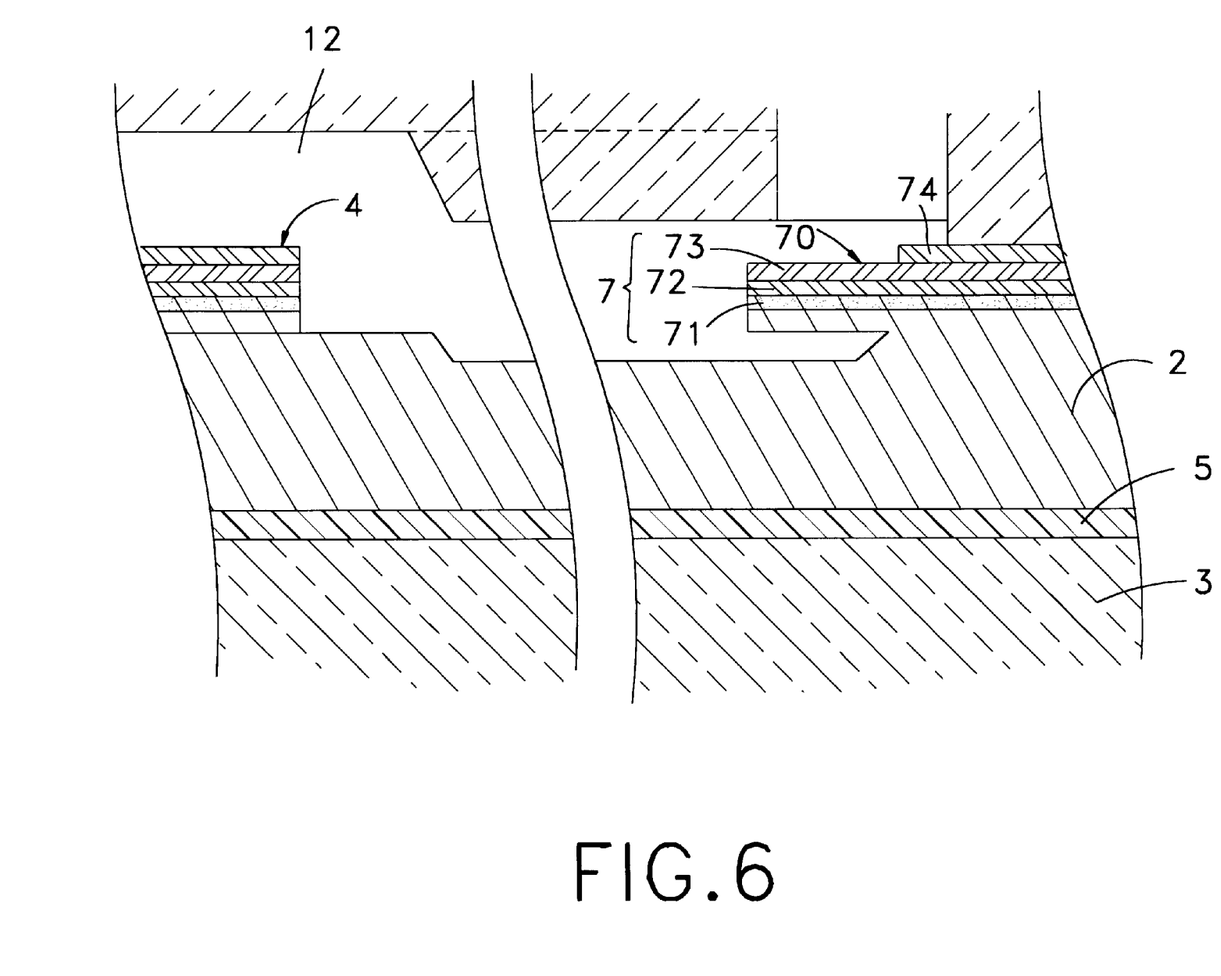
FIG. 6 is an enlarged view of FIG. 1 in part, showing the precipitated films of the sensing unit.

Whatever modes the embodiments of the present invention may have, the sensing unit 7 is made by integration process (the subject of another patent application) to constitute both the microbridge structure 23 and the sensing unit 7. As shown in FIG. 6, the sensing unit 7 is synchronously made with the microvalve zone, constructing in sequence the film layers of a boron(p+) layer 71, a silicone oxide ($SiO_2$) layer 72, a polysilicon layer 73, and a silicon nitride ($Si_3N_4$) layer 74. The polysilicon is preferably to be annealed to obtain a unisilicon character which performs better in pressure resistance, and also to be precipitated by lower pressured chemical gas for about 0.3 pm thick. The boron layer 71 is preferably formed by expanding the surface of the silicon middle layer downwardly and can be replaced by other materials such as precipitated multi-layers of silicon nitride, silicon oxide, or polyamide.

Another feasible embodiment is shown in FIG. 4, in which the position of the inlet is changed. In other words, the inlet located at the upper layer 1 in the embodiment shown in FIG. 1 is shifted to the lower layer 3 and designated by the reference numeral 32.

In order that the suspension 22 of the microvalve unit as a slightly arched configuration, a silicon oxide layer or polysilicon high polymer layer may be precipitated on the valve nozzle 24 by precipitation or etching during formation of the bottom rim of the intermediate layer 2, and the precipitated layer is then etched to achieve a slightly projecting valve nozzle; or alternatively, by extends the silicon directly to form into a preferred valve nozzle.

Figure 5:
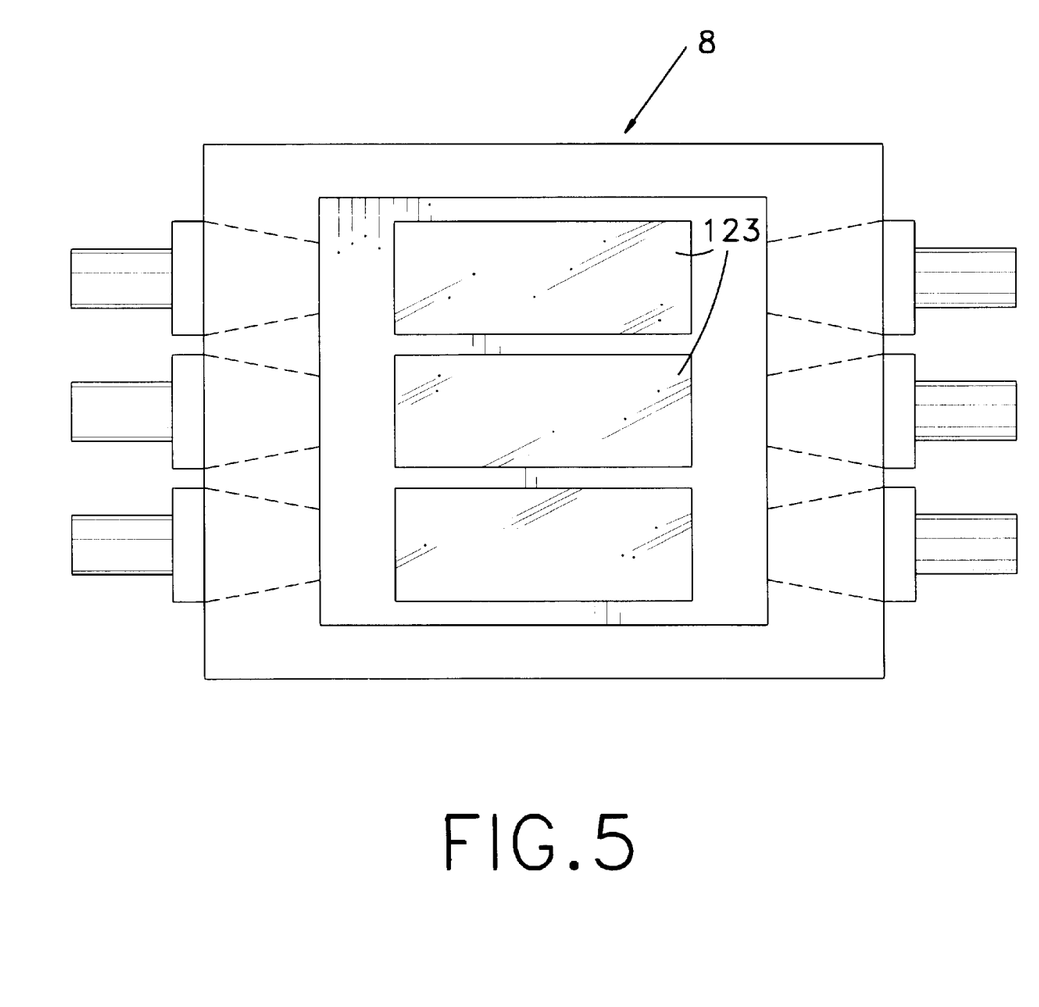
FIG. 5 is a plan view of an embodiment in which a plurality of modules are utilized.

The module 123 of the present invention can be used alone, or, as shown in FIG. 5, a plurality of modules 123 are utilized to form a flow control assembly 8 or to enable large fluid flows.

The module of the present invention has the following practical effects:

1. The use of films and silicon etching technique enables batch production, low costs, and compactness.

2. The integrated microvalve element and the flow sensing elements, through the use of coupling technique, achieve a three-layered structure which forms an integrated microflow control system module. Compared to conventional mass flow controllers, the entire system is compact in size, easy to assemble, and provides enhanced reliability.

3. The microstructure of the microvalve zone is proportional to the external voltages so that it has the functions of a proportional valve. Additionally, the microstructure of the silicon chip provides more stable mechanical characteristics to considerably enhance reliability and precision.

4. The microvalve utilizes thermally-driven methods such as thermal buckling or bimetal to provide greater drive deflection and require smaller drive voltages as compared to the use of other driving method.

5. The deflection is achieved by the momentum change between the flow and the pressure-resistant micro-suspending arm which deflects the microstructure and catches the differences of the flow amount. The time taken in such reaction is less than that of a conventional heating type flow sensor; meanwhile, the flow range to be detected in the present invention is also bigger that a conventional one.

6. As the suspension of the flow sensing zone is restricted in the small fluid channel, the flow of fluid will not be excessive as to become a turbulence which will interfere with the signals.

Although the present invention has been illustrated and described with reference to the preferred embodiment thereof, it should be understood that it is in no way limited to the details of such embodiment but is capable of numerous modifications within the scope of the appended claims.

What is claimed is:

1. An integrated micro pressure-resistant flow control module, comprising:

an upper layer, said upper layer having a lower rim, a first end and a second end, said first end of said upper layer having a pressure chamber;

an intermediate layer tightly coupled to the lower rim of said upper layer, said intermediate layer having a lower rim and a first end, said first end of said intermediate layer having a lower portion provided with a semi-closed pressure distribution chamber, said pressure distribution chamber communicating with said pressure chamber, a valve nozzle being disposed in said pressure distribution chamber, said first end of said intermediate layer having a mesa suspension formed by precipitation and etching which is located at an upper region of said valve nozzle, said suspension having thermally-driven elements disposed thereon, and at least two sides of said suspension being respectively provided with a microbridge structure; and a lower layer, tightly coupled to the lower rim of said intermediate layer and having a first end and a second end, one of said ends being provided with a fluid outlet which communicates with said pressure distribution chamber via said valve nozzle;

said pressure chamber having a front end, said front end of said pressure chamber having a microflow sensing unit, said sensing unit having a micro-suspending arm of pressure-resistant materials being synchronously formed with said suspension and said microbridge structures in precipitation and etching, said sensing unit reflecting the change in resistance via a deflection of said micro-suspending arm so as to detect the amount of fluid flow.

2. An integrated micro pressure-resistant flow control module as defined in claim 1, wherein said valve nozzle has a downwardly projecting valve seat which extends from a bottom rim of said suspension, said valve seat being tightly coupled to said lower layer such that said suspension is always maintained to arch upwardly.

3. An integrated micro pressure-resistant flow control module as defined in claim 1, wherein said second end of said upper layer is provided with an inlet for guiding fluid into said pressure chamber.

4. An integrated micro pressure-resistant flow control module as defined in claim 1, wherein said second end of said lower layer is provided with an inlet for guiding fluid into said pressure chamber.

5. An integrated micro pressure-resistant flow control module as defined in claim 1, wherein said thermally driven elements are formed by an electric heating film provide on an upper rim of said suspension for generating thermal buckling deflection when said intermediate layer is supplied with electric currents.

6. An integrated micro pressure-resistant flow control module as defined in claim 1, wherein said micro-suspending arm of said sensing unit is comprised of precipitated film layers which are, in sequence, a diffused implanted boron layer, a silicon oxide layer, a polysilicon layer, and a silicon nitride layer.

7. An integrated micro pressure-resistant flow control module as defined in claim 6, wherein said boron layer of said micro-suspending arm is replaced by a precipitated layer of silicon nitride.

8. An integrated micro pressure-resistant flow control module as defined in claim 6, wherein said boron layer of said micro-suspending arm is replaced by a multi-layered structure of silicon nitride and silicon oxide.

9. An integrated micro pressure-resistant flow control module as defined in claim 6, wherein said boron layer of said micro-suspending arm is replaced by a precipitated layer of polyamide.

10. An integrated micro pressure-resistant flow control module as defined in claim 1, wherein said suspension has a diffused implanted boron layer thereon; and said thermally-driven elements being comprised of precipitated layers which are, in sequence, a silicon oxide layer, a polysilicon layer, and a silicon nitride layer of said implanted boron layer.

11. An integrated micro pressure-resistant flow control module as defined in claim 10, wherein said boron layer of said suspension is replaced by a precipitated layer of silicon nitride.

12. An integrated micro pressure-resistant flow control module as defined in claim 10, wherein said boron layer of said suspension is replaced by a multi-layered structure of silicon nitride and silicon oxide.

13. An integrated micro pressure-resistant flow control module as defined in claim 10, wherein said boron layer of said suspension is replaced by a precipitated layer of polyamide.

14. An integrated micro pressure-resistant flow control module as defined in claim 1, wherein said micro-suspending arm has a length of 100–400 m.

15. An integrated micro pressure-resistant flow control module as defined in claim 1, wherein said micro-suspending arm has a width of 30–200 m.

16. An integrated micro pressure-resistant flow control module as defined in claim 3, wherein said pressure chamber communicates with said inlet via a microflow channel.

17. An integrated micro pressure-resistant flow control module as defined in claim 4, wherein said pressure chamber communicates with said inlet via a microflow channel.

18. An integrated micro pressure-resistant flow control module as defined in claim 2, wherein said valve nozzle has a lower rim and said valve seat is formed by a film precipitated at the lower rim of said valve nozzle.

19. An integrated micro pressure-resistant flow control module as defined in claim 2, wherein said valve seat is formed by a downward extension from said valve nozzle.

* * * * *